United States Patent [19]
Dernbach

[11] Patent Number: 5,405,568
[45] Date of Patent: Apr. 11, 1995

[54] TWO-PIECE SEGMENTED TIRE MOLD AND METHOD OF MOLDING

[75] Inventor: Helmut Dernbach, Cuyahoga Falls, Ohio

[73] Assignee: The Goodyear Tire & Rubber Company, Akron, Ohio

[21] Appl. No.: 966,525

[22] Filed: Oct. 26, 1992

[51] Int. Cl.⁶ .............................................. B29C 35/02
[52] U.S. Cl. ..................... 264/326; 264/315; 425/32; 425/38; 425/47
[58] Field of Search .................. 425/38, 44, 46, 47, 425/31, 32; 264/315, 326

[56] References Cited

U.S. PATENT DOCUMENTS

| | | | |
|---|---|---|---|
| 3,787,155 | 1/1974 | Zangl | 425/47 |
| 3,806,288 | 4/1974 | Materick | 425/47 |
| 4,022,554 | 5/1977 | MacMillan | 425/23 |
| 4,025,250 | 5/1977 | MacMillan | 425/17 |
| 4,289,463 | 9/1981 | Le Moullac | 425/38 |
| 4,957,676 | 9/1990 | Greenwood | 425/44 |
| 5,208,044 | 5/1993 | Miyata et al. | 425/46 |

FOREIGN PATENT DOCUMENTS

WO90/09268  8/1990  WIPO.

*Primary Examiner*—Mathieu D. Vargot
*Attorney, Agent, or Firm*—Frederick K. Lacher; T. P. Lewandowski

[57] ABSTRACT

A tire mold having an upper mold section and a lower mold section with mold segments mounted for sliding movement radially and axially between molding positions and unloading positions of the tire. Springs are provided between the mold segments and the mold sections for urging movement of the mold segments into molding positions and permitting movement of the mold segments into unloading positions for releasing the tread portion of the tire so that it will not be damaged upon opening of the mold.

14 Claims, 3 Drawing Sheets

TWO-PIECE SEGMENTED TIRE MOLD AND METHOD OF MOLDING

SUMMARY OF THE INVENTION

This invention relates to a segmented tire mold in which the mold segments are slidably mounted for movement radially and axially between molding and unloading positions where the segments are disengaged from the tire tread. In the manufacture of radial tires it has been necessary to provide radial movement of the tread portions of the mold to release the cured tire tread from the mold. This has required a relatively expensive segmental mold as compared to a two-piece mold.

It has been found that for certain radial tire constructions a two-piece mold may be used with mold segments slidably mounted so that during the mold opening cycle of the two-piece mold the tire pulls the segments out of their two-piece mold positions. Due to the inclined positions of the guide bushings for the segments, the tread portions of the segments pull away from the tire and thereby release the tire. The springs connecting the tread segments and mold sections pull the segments back into their original two-piece molding position ready for receiving another tire for molding and vulcanization.

In accordance with one aspect of the invention, there is provided a method of molding a tire in a tire mold having an upper mold section, a lower mold section, a plurality of upper mold segments, slidably supported in the upper mold section for movement between a molding position and an unloading position, a plurality of lower mold segments slidably supported in the lower mold section for movement between a molding position and an unloading position, and at least the upper mold segments having resilient means for urging movement of the upper segments toward the molding positions while permitting movement of the upper mold segments toward the unloading position, comprising:

(a) opening the mold by separating the upper mold section and the lower mold section with the resilient means retaining the upper mold segments in the molding position and the weight of the lower segments retaining the lower mold segments in the molding positions;

(b) positioning an unvulcanized tire between the upper mold section and the lower mold section;

(c) closing the mold by bringing the upper mold section and the lower mold section together;

(d) heating the tire under pressure in the mold to at least partially vulcanize the tire in the mold and form a tread portion with the upper mold segments and the lower mold segments;

(e) opening the mold by moving the upper mold section and the lower mold section apart with the upper mold segments and the lower mold segments in engagement with the tread portion of the tire causing the mold segments to be moved away from the mold sections in a direction generally axially of the mold and away from the tire in a direction generally radially of the mold with the resilient means permitting movement of the upper segments towards the unloading position to disengage the molding surfaces of the mold segments from the tread portion of the tire as the mold sections are separated; and (f) removing the tire from the mold.

In accordance with another aspect of the invention, there is provided a tire mold having an upper mold section and a lower mold section, a plurality of upper mold segments slidably supported in the upper mold section for movement between a molding position and an unloading position, a plurality of lower mold segments slidably supported in the lower mold section for movement between a molding position and an unloading position, upper resilient means between the upper mold section and the upper mold segments for urging movement of the upper mold segments toward the molding positions while permitting movement of the upper mold segments towards the unloading position; and the weight of the lower mold segments urging movement of the lower mold segments towards the molding position while permitting movement of the lower mold segments towards the unloading position.

DETAILED DESCRIPTION OF THE INVENTION

Figure 1:
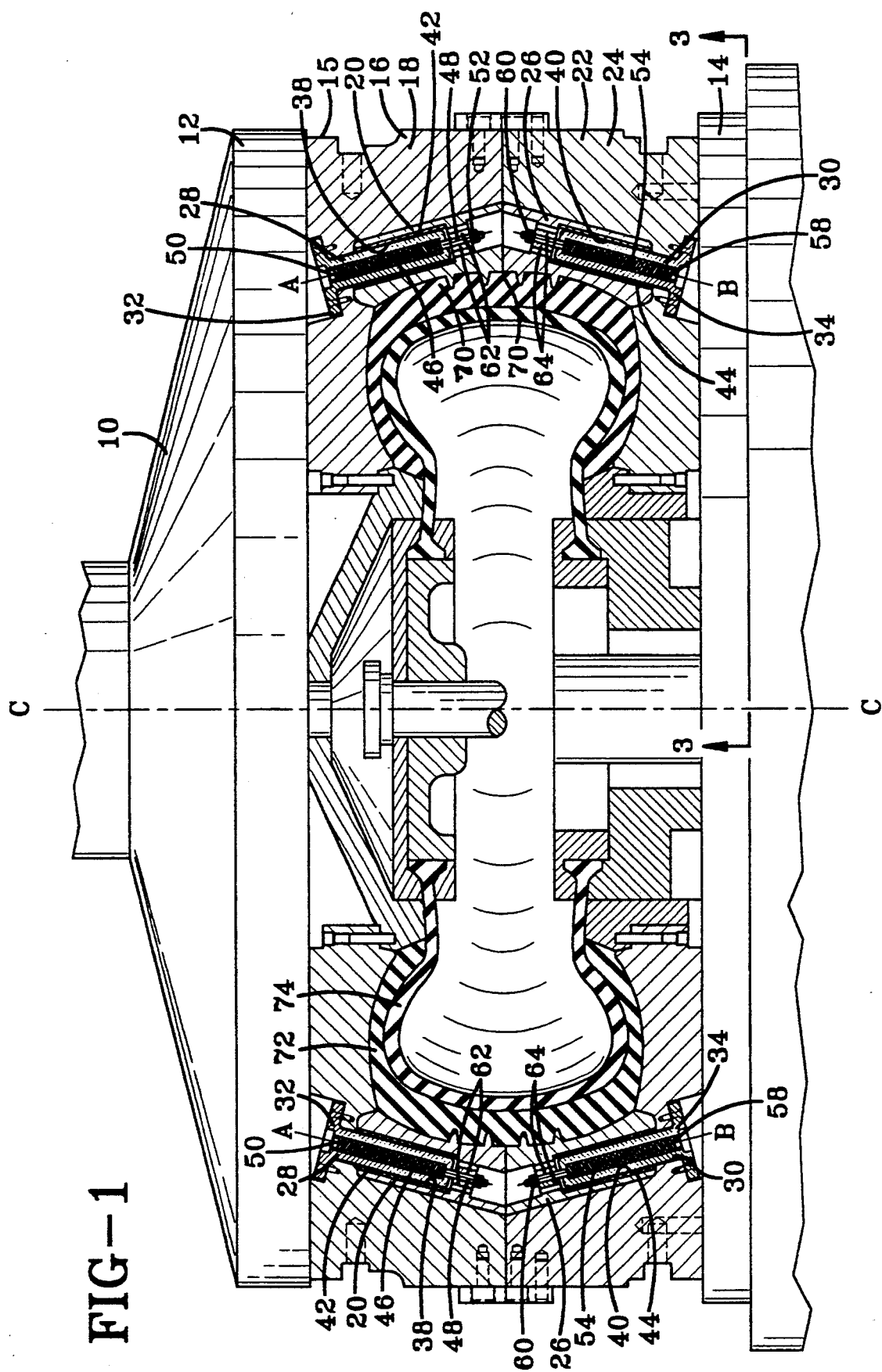
FIG. 1 is an axial section through a tire mold embodying the invention shown in a tire press which is closed and with the tire in the molded position, parts being broken away.
Figure 3:
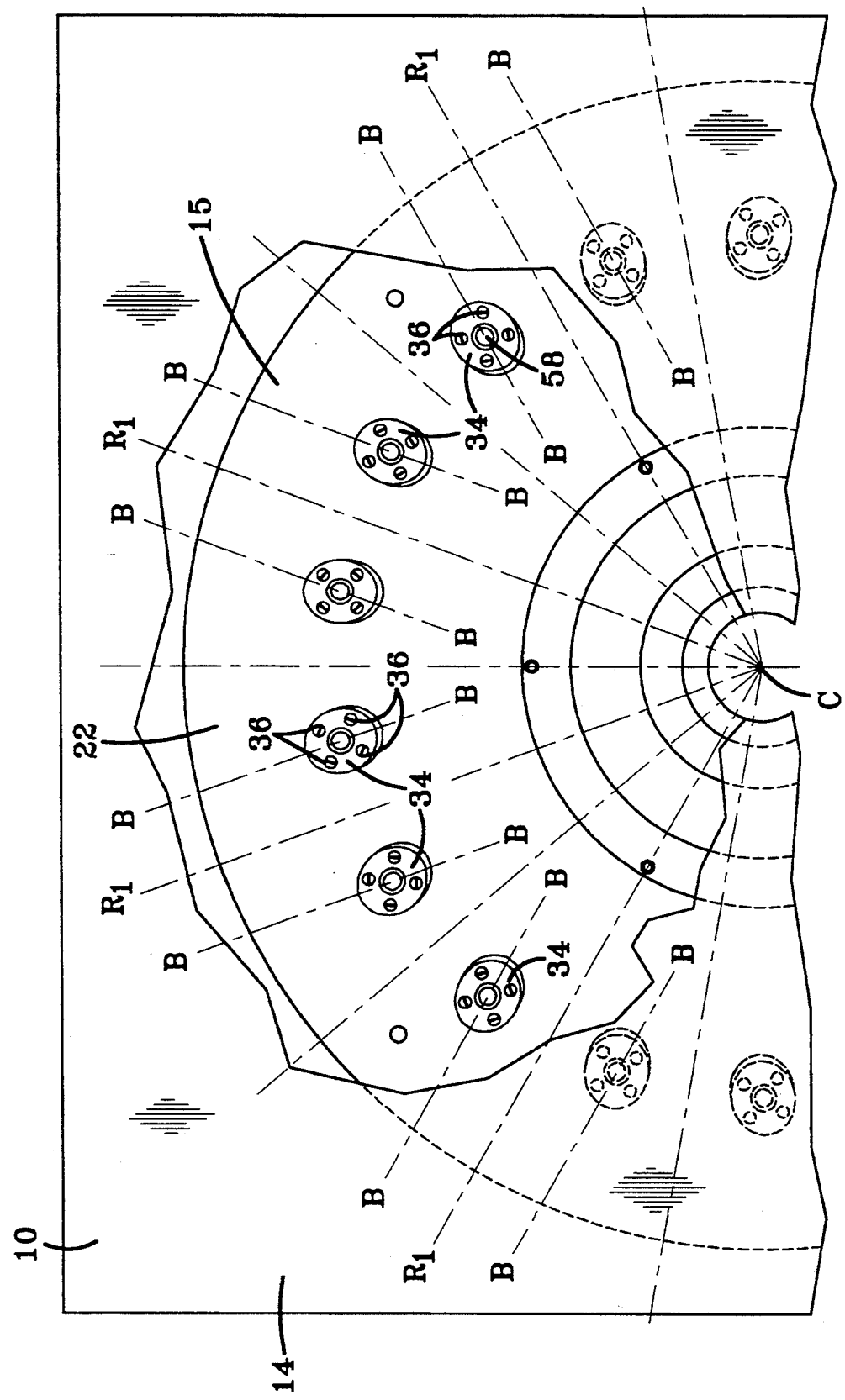
FIG. 3 is a view taken along line 3—3 in FIG. 1 with parts being broken away to show the attachment of the piston members to the mold section and the parallel positions of the cylinders for guiding the piston members attached to each of the mold segments.

Referring to FIGS. 1 and 3, a tire press 10 is shown having an upper press platen 12 and a lower press platen 14 containing a tire mold 15 embodying the invention. Mounted on the upper press platen 12 is an upper mold section 16 of the mold 15 which includes a full circle mold back 18 and a plurality of upper mold segments 20 in sliding engagement with the mold back.

Mounted on the lower press platen 14 is a lower mold section 22 of the mold 15 which includes a full circle lower mold back 24 and a plurality of lower mold segments 26 slidably mounted on the lower mold back. In the embodiment shown in FIGS. 1, 2 and 3, there are nine upper mold segments 20 and nine lower mold segments 26. A greater or lesser number of these segments 26 may be provided depending upon the tread pattern of the tire to be molded.

Each of the upper mold segments 20 and lower mold segments 26 are supported on the upper mold back 18 and lower mold back 24 respectively by resilient damping and guiding means such as upper cylindrical pistons 28 and lower cylindrical pistons 30 having upper flanges 32 and lower flanges 34 respectively fastened to the upper mold segments 20 and lower mold segments 26 as by screws 36. In this embodiment, each of the upper mold segments 20 and lower mold segments 26 are slidably supported on two of the upper cylindrical pistons 28 and two of the lower cylindrical pistons 30. Axes A—A of the upper cylindrical pistons 28 are in parallel relationship and axes B—B of the lower cylindrical pistons 30 are in parallel relationship to guide the upper segments 20 and lower segments 26 which have upper cylinders 38 and lower cylinders 40 for receiving the upper cylindrical pistons 28 and lower cylindrical pistons 30 respectively. Inclined guide bushings 42 and 44 may be provided in the upper cylinders 38 and lower cylinders 40 respectively in engagement with the upper cylindrical pistons 28 and lower cylindrical pistons 30.

Upper resilient means such as upper coil springs 46 are positioned in the upper cylindrical pistons 28 and have upper spring compression rods 48 with flanged heads 50 for bearing against the upper end of the springs 46 and extending through an opening in the closed end of the upper cylindrical pistons and through the end of the upper cylinders 38 where nuts 52 may be threaded on the projecting end of the upper spring compression rods 48.

Similar resilient means may be provided for the lower mold segments 26 with lower coil springs 54 positioned in the lower cylindrical pistons 30 and lower spring compression rods 56 with flanged heads 58 for engaging one end of the lower coil spring 54. The lower spring compression rods 56 have an upper end extending through an opening in the lower cylindrical pistons and through an upper end of the lower cylinders 40 where nuts 60 may be threaded on the ends of the rods 56.

The upper cylindrical pistons 28 in upper cylinders 38 and the lower cylindrical pistons 30 in lower cylinders 40 provide damping of the movement of the upper mold segments 20 and lower mold segments 26. Restricted orifices 62 in the ends of the upper cylinders 38 and orifices 64 in the ends of the lower cylinders 40 may be provided to control the movement of the upper mold segments 20 and lower mold segments 26 when the segments are being pulled back into the molding position shown in FIG. 1.

The upper mold segments 20 and lower mold segments 26 have a tread forming surfaces 66 and 68 respectively for forming a tread 70 of a tire 72 which may be placed in the tire press 10 in unvulcanized condition with the upper mold segments 20 and lower mold segments 26 in the mold position shown in FIG. 1. The tire press 10 may be of the type having a bladder 74 mounted on an upper chuck 76 and lower chuck 78 which are moveable relative to the mold sections 16 and 22 in a manner well known in the tire press art. The bladder 74 is also inflatable and may be filled with steam or hot water during vulcanization of the tire 72.

Figure 2:
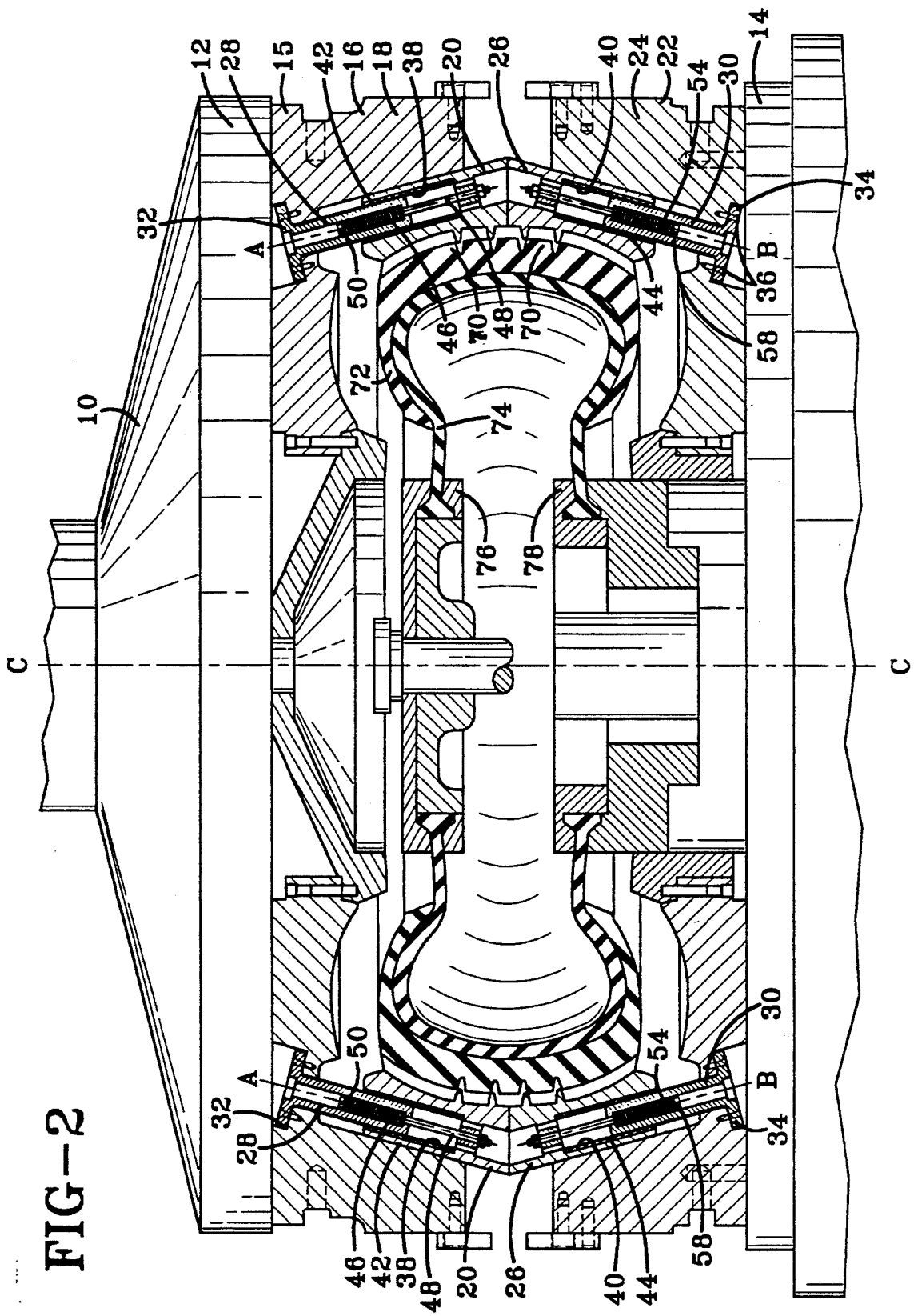
FIG. 2 is an axial section through a tire mold like FIG. 1 showing the mold in the unloading position with the mold segments disengaged from the tire tread.

In operation of the tire press 10 with the upper mold segments 20 and lower mold segments 26 embodying the invention, the tire 72 is placed in the tire mold 15 with the segments in the position shown in FIG. 1. Prior to placing the tire 72 in the mold 15, the upper mold segments 20 and lower mold segments 26 are moved into the molding position of FIG. 1 by the upper coil springs 46 and lower coil springs 54 urging the upper spring compression rods 48 and lower spring compression rods 56 into the extended positions shown in FIG. 1. The lower coil springs 54 may not be provided in some installations where the weight of the lower mold segments 26 is sufficient to move the segments into the molding position. The tire mold 15 is then closed by bringing the upper mold section 16 and lower mold section 22 together. The tire 72 is heated under pressure to at least partially vulcanize the tire in the mold 15 and form the tread portion 70 with the tread forming surfaces 66 and 68 of the mold segments 20 and 26. The tire mold 15 then may be opened by moving the upper mold section 16 and lower mold section 22 apart while the upper mold segments 20 and lower mold segments 26 are in engagement with the tread portion 70 of the tire 72. This causes the upper mold segments 20 and lower mold segments 26 to be moved away from the upper mold section 16 and lower mold section 22 in a direction generally axially of the mold 15 and away from the tire 72 in a direction generally radially of the mold as shown in FIG. 2. The radial direction is relative to the axis C—C and is shown along lines R—R in FIG. 3 for the different mold segments 20 and 26. The resilient means such as the coil springs 46 and 54 permit movement of the segments 20 and 26 towards the unloading position shown in FIG. 2 to disengage the molding surfaces such as tread forming surfaces 66 and 68 from the tread 70 of the tire 72 as the mold sections 16 and 22 are separated. The chucks 76 and 78 may also be held in a predetermined position during the opening of the press 10.

The coil springs 46 and 54 of some segments 20 and 26 may provide different resistances to movement of the segments whereby some of the segments are separated from the tread portion 70 before other segments during opening of the mold 15. For example, the upper coil springs 46 may have a greater resistance to movement than the lower coil springs 54 so that the tread forming surface 66 of the upper mold segments will remain in engagement with the tread 70 after it is separated from the tread forming surfaces 68 of the lower mold segments 26. This may be desirable for unloading the tire 72 from the press 10 after the chucks 76 and 78 and bladder are retracted in the lower mold section 22 and an unloading platform (not shown) is inserted under the tire 72.

When the mold segments 20 and 26 are moved radially and axially into the unloading position shown in FIG. 2 the coil springs 46 and 54 will urge the segments toward the molding positions shown in FIG. 1 as soon as the tread forming surfaces 66 and 68 are separated from the tread position 70. It is important that the movement of the mold segments 20 and 26 be controlled so that the tire 72 and the tire mold sections 16 and 22 are not damaged. This may be accomplished by damping means such as the pistons 28 and 30 in the cylinders 38 and 40 which retain air under compression in the cylinders and slowly release the air. The orifices 62 and 64 also control the return movement of the segments 20 and 26 to the molding positions. The rate of return movement of the segments 20 and 26 may be increased or decreased by increasing or decreasing the size of the orifices 62 and 64.

With each of the segments. 20 and 26 mounted on parallel guide means having parallel axes B—B of the lower pistons and the parallel axes A—A of the upper pistons 28 the sliding movement of the mold segments is confined to predetermined paths during opening of the press 10. In this embodiment the movement of the segments 20 and 26 is axially and radially of the press 10 providing the release of the tread portion 70 from the tread forming surfaces 66 and 68 of the segments 20 and 26 upon opening of the tire mold 15.

While a certain representative embodiment and details have been shown for the purpose of illustrating the invention, it will be apparent to those skilled in the art that various changes and modifications may be made therein without departing from the spirit or scope of the invention.

What is claimed is:

1. A method of molding tire in a tire mold having an upper mold section, a lower mold section, a plurality of upper mold segments slidably supported in said upper mold section for movement between a molding position and an unloading position, a plurality of lower mold segments slidably supported in said lower mold section for movement between a molding position and an unloading position, and at least said upper mold segments having resilient means for urging movement of said upper mold segments toward said molding position while permitting movement of said upper mold segments toward said unloading position comprising:

(a) opening said mold by separating said upper mold section and said lower mold section with said resilient means retaining said upper mold segments in said molding positions and the weight of said lower mold segments retaining said lower mold segments in said molding positions;

(b) positioning an unvulcanized tire between said upper mold section and said lower mold section;

(c) closing said mold by bringing said upper mold section and said lower mold section together with said upper mold segments and said lower mold segments in said molding position;

(d) heating said tire under pressure in said mold to at least partially vulcanize said tire in said mold and form a tread portion in engagement with said upper mold segments and said lower mold segments;

(e) opening said mold by moving said upper mold section and said lower mold section apart with said upper mold segments and said lower mold segments in engagement with said tread portion of said tire causing said upper mold segments and said lower mold segments to be moved away from said upper mold section and said lower mold section in a direction generally axially of said mold and away from said tire in a direction generally radially of said mold with said resilient means permitting movement of said upper mold segments towards said unloading position while in engagement with said tread portion where the molding surfaces of said upper segments may be disengaged from said tread portion of said tire as said upper mold section and said lower mold section are separated; and (f) removing said tire from said mold.

2. The method of claim 1 wherein said lower mold segments have resilient means for providing an additional force for retaining said lower mold segments in said molding position and permitting movement of said lower mold segments towards said unloading position while in engagement with said tread portion.

3. The method of claim 2 wherein said resilient means for some of said upper mold segments and said lower mold segments provides more resistance to radial movement of said mold segments than said resilient means for other of said mold segments whereby some of said mold segments are disengaged from said tread portion before other of said mold segments during opening of said tire mold.

4. The method of claim 3 wherein the resistance of the resilient means for said upper mold segments in said upper mold section are of a different magnitude than the resistance of said resilient means of said lower mold segments in said lower mold section whereby the tire is selectively retained in either said upper mold section of said lower mold section during opening of said tire mold.

5. The method of claim 3 wherein said upper mold segments and said lower mold segments have damping means whereby the return movement of said upper mold segments and said lower mold segments to said molding positions is controlled after disengagement from said tread portion to prevent damage to said tire and tire mold.

6. The method of claim 5 wherein each of said upper mold segments and said lower mold segments is slidably mounted on parallel guide means on said upper mold section and said lower mold section whereby said sliding movement of said upper mold segments and said lower mold segments is confined to predetermined paths during opening of said mold.

7. A tire mold for molding a tire having an upper mold section and a lower mold section, a plurality of upper mold segments engagable with a tread portion of said tire slidably supported in said upper mold section for movement between a radially inward molding position and a radially outward unloading position, a plurality of lower mold segments engagable with said tread portion slidably supported in said lower mold section for movement between said molding position and said unloading position, upper resilient means between said upper mold section and said upper mold segments for urging movement of said upper mold segments toward said molding position while permitting movement of said upper mold segments in engagement with said tread portion toward said unloading position and the weight of said lower mold segments urging movement of said lower mold segments toward said molding position while permitting movement of said lower mold segments in engagement with said tread portion toward said unloading position.

8. The apparatus of claim 7 including lower resilient means between said lower mold section and said lower mold segments providing an additional force for retaining said lower mold segments in said molding position and permitting movement of said lower mold segments in engagement with said tread portion towards said unloading positions.

9. The apparatus of claim 8 wherein said upper resilient means and said lower resilient means comprise coil springs positioned for compression upon movement of said upper mold segments and said lower mold segments toward said unloading position.

10. The apparatus of claim 9 wherein said coil springs of said upper resilient means provide a different amount of resistance to movement of said upper mold segments than said coil springs of said lower resilient means so that some of said upper mold segments and said lower mold segments are separated from said tread portion before other of said upper mold segments and said lower mold segments during opening of said mold to selectively retain said tire in said lower mold section or said upper mold section during opening of said mold.

11. The apparatus of claim 10 including damping means between said upper mold segments and said upper mold section and between said lower mold segments and said lower mold section to control the return movement of said upper mold segments and said lower mold segments to said molding position after disengagement from said tread portion.

12. The apparatus of claim 11 wherein said damping means includes piston means mounted on said upper mold section and lower mold section and cylinders for said piston means in said upper mold segments and said lower mold segments with cylinder damping control orifices in said cylinders for controlling the return movement of said upper mold segments and said lower mold segments by restricting the air flow out of said cylinders.

13. The apparatus of claim 12 wherein each of said upper mold segments and said lower mold, segments has at least two cylinders with parallel axes for confining sliding movement of said upper mold segments and said lower mold segments to predetermined paths during opening of said mold.

14. The apparatus of claim 13 wherein said pistons have spring chambers for said coil springs and each of said coil springs has a spring retaining rod in engagement with one end of each of said springs and in engagement with one of said upper mold segments or said lower mold segments at the other end of said retaining rod.

* * * * *